April 6, 1965   A. C. SCINTA   3,176,336
WIPER ARM
Filed Aug. 12, 1963   4 Sheets-Sheet 1

INVENTOR.
ANTHONY C. SCINTA
BY
Bean Brooks Buckley & Bean
ATTORNEYS.

April 6, 1965 A. C. SCINTA 3,176,336
WIPER ARM

Filed Aug. 12, 1963 4 Sheets-Sheet 2

INVENTOR.
ANTHONY C. SCINTA
BY
Bean Brooks Buckley & Bean
ATTORNEYS.

April 6, 1965  A. C. SCINTA  3,176,336
WIPER ARM

Filed Aug. 12, 1963  4 Sheets-Sheet 3

INVENTOR.
ANTHONY C. SCINTA
BY
Bean Brooks Buckley & Bean
ATTORNEYS.

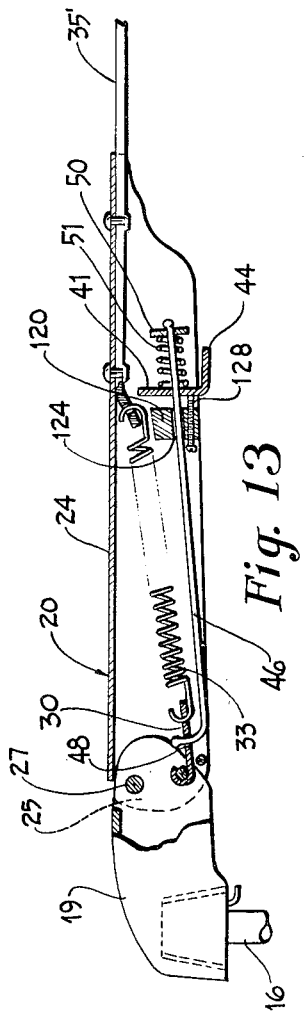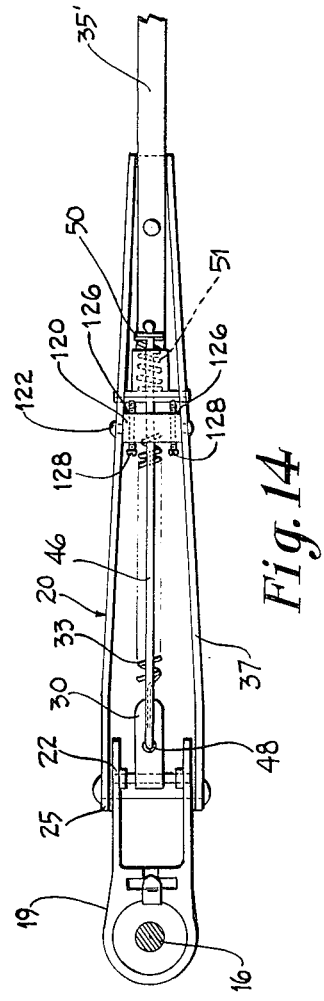

3,176,336
WIPER ARM
Anthony C. Scinta, Hamburg, N.Y., assignor to
Trico Products Corporation, Buffalo, N.Y.
Filed Aug. 12, 1963, Ser. No. 303,209
11 Claims. (Cl. 15—250.35)

This application is a continuation-in-part of application Serial No. 191,114, filed April 30, 1962, now abandoned.

The present invention relates to the windshield cleaning art and more particularly to an improved construction for maintaining a windshield wiper in cleaning contact with a vehicle windshield against the wind forces tending to lift the wiper from the windshield at high vehicle speeds.

In general a windshield wiper system includes a wiper having a wiping element in contact with the surface of a windshield, the wiper being carried at the outer end of a wiper arm. The wiper arm consists of two sections, an inner section which is rigidly mounted on a drive shaft extending from the cowl of a vehicle and an outer section which is pivotally mounted on the inner section for movement toward and away from the windshield. A spring extends between the inner and outer sections of the wiper arm for biasing said outer section, which carries the wiper, toward the windshield. The spring is designed to cause the wiper carried by the outer arm section to bear against the windshield with a sufficient pressure to effect good wiping contact when the wiper is not subjected to wind lift. On one hand, when the tension of the spring is of a value which will provide the above-noted optimum wiping pressure, the wind lift produced by the vehicle traveling at high speeds will cause the wiper to move away from the windshield against the bias of said arm spring. On the other hand, if the spring tension is increased to a relatively high value in an attempt to eliminate the above noted lifting of the wiper from the windshield at high vehicle speeds, the wiping element of the wiper will be subjected to stresses produced by the increased pressure thereof on the windshield which, in turn, will cause it to deteriorate rapidly. It is with the overcoming of the foregoing shortcomings of the prior art that the present invention is concerned.

It is accordingly the primary object of the present invention to provide a windshield wiper arm construction which is capable of exerting optimum wiping pressure on a wiper carried thereby during all conditions of vehicle operation and which positively prevents a wiper from being lifted and suspended away from the windshield by wind lift forces experienced and at high vehicle speeds.

Another object of the present invention is to provide a wiper arm construction which is capable of producing optimum wiper pressure during all conditions of vehicle operation, including operation at high vehicle speeds when the wiper is subjected to high wind lifting forces, without subjecting the wiping element of the wiper to the rubber deteriorating stresses incidental to the use of heavier arm pressures which were heretofore used to maintain the wiping element in contact with a windshield at high vehicle speeds.

It is a still further object of the present invention to provide a wiper and wiper arm combination which not only prevents the wiper from being lifted from the windshield by wind currents at high vehicle speeds, but also provides improved wiping under all conditions of vehicle operation. Other objects and attendant advantages of the present invention will readily be perceived hereafter.

One aspect of the present invention relates to an improved wiper arm having a one way locking or arresting mechanism incorporated therein for preventing the wiper arm, and the wiper carried thereby, from being suspended away from a windshield by wind lift at high vehicle speeds. To install the present wiper arms, the inner mounting portion thereof is mounted on the rockshaft. At this time, the movable outer portion of the wiper arm, which carries the wiper, is held away from the windshield. Thereafter the outer arm portion is released, whereupon the contraction of the wiper arm spring will cause the wiper to come to rest against the windshield with the required wiping pressure. The one way lock or arresting means noted above in no way impedes the foregoing type of action. However, the one way lock, while it is in a locked condition, prevents the wiper arm from being moved away from the windshield. Thus the wiper rests against the windshield with sufficient wiping pressure resulting from the bias of the spring, while suspension by movement of the wiper arm and the wiper carried thereby away from the windshield by wind lift is positively prevented by the above mentioned holding or lock mechanism.

In the event that it is desired to pull the wiper away from the windshield, as is required during the manual cleaning of the windshield, it is only necessary to deactuate the lock by the manipulation of an unlatching member on the wiper arm while pulling the outer spring biased wiper arm section away from the windshield. When it is desired to reposition the wiper on the windshield, it is merely necessary to release the wiper arm, and the arm spring will return the wiper to the windshield and automatically provide the required wiping pressure. No adjustment of the wiping pressure is necessary, as this is accomplished automatically in the manner noted above. It will readily be appreciated that the required spring force which is utilized to maintain the wiping element of the wiper in contact with the glass subjects said wiping element only to the amount of stress which is necessary for optimum wiping. Since no excess force is required to maintain the wiper in contact with the windshield against the wind lift force tending to lift it therefrom, the wiper element is not subjected to any excessive stresses which tend to cause it to deteriorate. Thus, in addition to the anti-wind lift qualities of the instant construction, there is also inherent therein the feature of promoting longevity of the wiper element by obviating spring-produced excessive stresses to which it may otherwise be subjected.

Another aspect of the present invention consists of using the above described wiper arm with a wiper for a curved windshield having levers which are spring biased toward the windshield. In the past this type of wiper was used with the conventional wiper arm which did not have a locking mechanism tending to prevent the wiper arm from moving away from the windshield. Thus the spring of the wiper itself produced a force which is subtracted from the spring force of the wiper arm. However, since the wiper arm of the present invention possesses the above described locking mechanism, the spring force of the wiper urging the wiper levers toward the windshield no longer acts against the spring force produced by the wiper arm once the blade is conformed to the glass. Thus the spring force biasing the levers toward the windshield is directed entirely toward conforming the wiping element carried by said levers into wiping contact with the windshield, rather than part of the spring force being utilized by being subtracted from the spring pressure produced by the wiper arm. Thus the combination of a wiper arm having the above described position locking mechanism with a wiper having spring biased levers tending to conform the wiping element to the windshield is capable of producing an improved wipe without the wiper being subjected to wind lift and without the wiping element being subjected to excessive pressures which cause deterioration thereof. The present invention will be more fully understood when the following portions of the specification are read in conjunction with the accompanying drawings wherein:

FIG. 13 is a side elevational view of a modified embodiment of this invention with portions thereof broken away, similar to FIG. 4, to disclose the internal mechanism; and FIG. 14 is a bottom plan view of the arm illustrated in FIG. 13.

Figure 1:
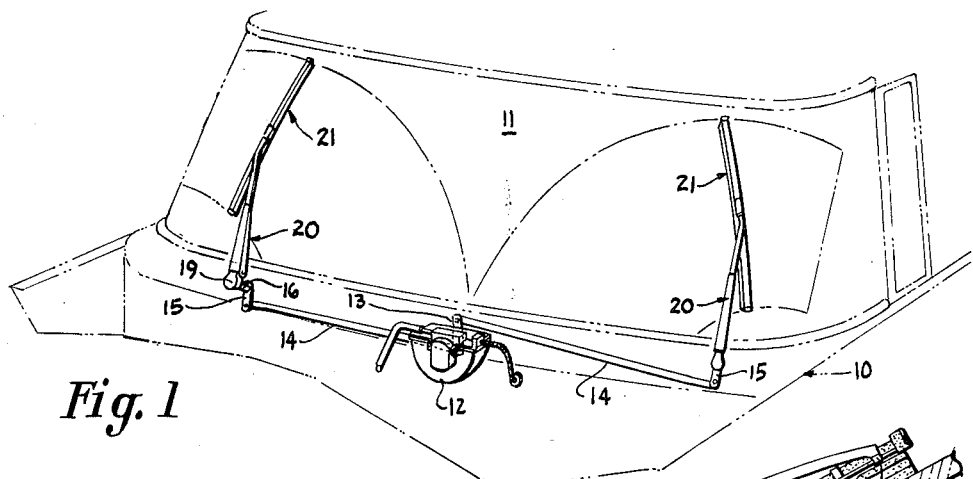
FIG. 1 is a fragmentary perspective view of an automotive vehicle mounting the improved wiper arrangement of the present invention.

In FIG. 1 an automotive vehicle 10 is shown having a windshield 11 mounted thereon in the conventional manner. Affixed to the fire wall of the vehicle, or otherwise suitably mounted beneath the cowl thereof, is a windshield wiper motor 12 having drive lever 13 thereon which is pivotally connected to links 14 which in turn, are pivotally connected to crankarms 15. Crankarms 15, in turn, are rigidly affixed to first ends of rockshafts 16 (FIG. 3) journalled in the cowl of the vehicle, the other ends of said crankarms having knurled drivers 17 for receiving mating apertures 18 within the mounting heads 19 of wiper arms 20. Mounted on the outer ends of wiper arms 20 are wipers 21. Whenever wiper motor 12 is in operation, the windshield wipers 21 will oscillate across select portions of the windshield to thereby clear moisture therefrom.

It is well understood in the art that when a vehicle is traveling at a high rate of speed, wind currents are created which tend to lift wipers 21 away from the windshield. When the wipers 21 are so lifted, they obviously cannot scrub the windshield in order to clear moisture therefrom. In accordance with one aspect of the present invention, an improved wiper arm construction is provided which permits the wiper carried thereby to be pressed against the windshield with an optimum wiping pressure, but which prevents the wiper from being lifted from the windshield by air currents when the vehicle is traveling at high speeds.

The improved wiper arm 20 of the present invention includes the above mentioned mounting head portion 19 having ears 22 at one end thereof. Each of the ears 22 has an aperture 23 therein. A spring retainer housing 24 is provided with ears 25 having apertures 26 therein. In order to assemble spring retainer 24 on mounting head portion 19, it is merely necessary to slip ears 25 into position over ears 22 and cause apertures 23 and 26 to be in alignment and thereafter insert rivet or pin 27 through the aligned apertures. Pin 27 permits spring retainer housing 24 to pivot toward and away from windshield 11 as described hereafter. A pin 28 is also located in apertures 29 in ears 22. Pin 28 serves as an anchor for strap 30, which has a curved end 31 which fits around pin 28. An aperture 31 is provided in strap 30 which receives one end 32 of spring 33, the other end 34 of spring 33 being received in aperture 34 at the end of bar stock member 35' which is riveted at one end thereof to spring retainer housing 24 by rivets 35 and which carries the wiper 21 at the other end thereof. Spring 33 is always in tension and, therefore, biases spring retainer housing 24 and bar stock member 35 toward an associated windshield inasmuch as spring retainer housing 24 can pivot about pivot 27. The spring 33 is designed to provide an optimum wiping pressure when the windshield wiper is not subjected to wind lift forces. It will readily be appreciated, however, that when wind lift forces are experienced during high speed operation of the vehicle, there will be a tendency for wiper 21 to lift from the glass.

Figure 6:
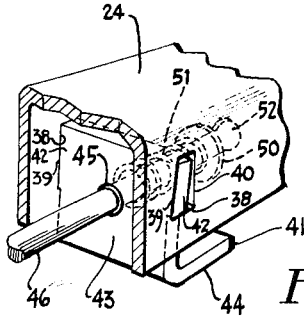
FIG. 6 is a fragmentary perspective view of the portion of the wiper arm having the improved unidirectional locking mechanism of the present invention.
Figure 8:
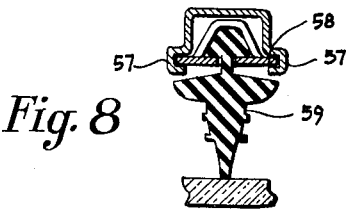
FIG. 8 is a cross sectional view taken along line VIII—VIII of FIG. 2.

In accordance with the present invention, the arm 20 incorporates a locking arrangement which permits the above discussed optimum spring pressure to be utilized, but which prevents the wiper arm from lifting away from the windshield. More specifically, the spring retainer 24 is generally of tapered channel shaped configuration having a top wall 36 and side walls 37. Side walls 37 have slots 38 therein of generally trapezoidal shape with a side wall 39 and a side wall 40. A locking member 41 (FIGS. 3, 4, and 6) has ears 42 which are located in slots 38. Ears 42 are a part of planar portion 43 of locking member 41, planar portion 43 lying between side walls 37. A tab 44 is formed at an angle to planar portion 43, and tab 44 extends outside of spring retainer housing 24. It will be understood that a cover plate (not shown) is placed across the open side of spring retainer housing 24 to protect the contents thereof from the elements. Planar portion 43 of locking member 41 possesses a circular aperture 45 therein through which cylindrical rod 46 extends. The lower end 47 of rod 46 extends through aperture 48 in strap 30. The upper end 49 of rod 46 carries washer 50 thereon. A spring 51 is interposed between washer 50 and planar portion 43 of locking member 41. The end 52 of rod 46 is peened over to hold washer 50 and spring 51 captive in the above described location.

Figure 3:
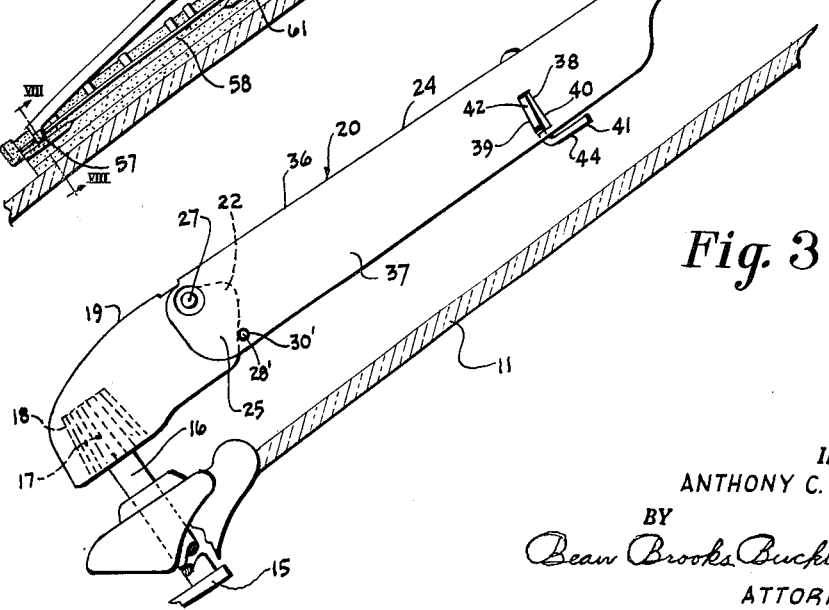
FIG. 3 is an elevational view of the improved wiper arm of the present invention.
Figure 4:
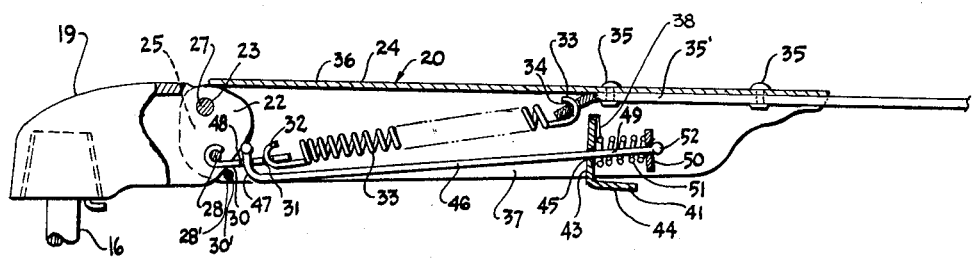
FIG. 4 is an elevational view of the improved wiper arm of the present invention with portions thereof broken away to disclose the internal mechanism.

The orientation between planar portion 43 of lock member 41 and rod 46 is such that if an attempt were made to pivot spring retainer housing 24 in a counter-clockwise direction in FIGS. 3 or 4, there would be binding between rod 46 and aperture 45, in the manner of a transom lock. However, the orientation between the locking member 41 and rod 46 is such that movement of spring retainer housing 24 is unimpeded in a clockwise direction. It will readily be appreciated, therefore, that the full spring force of spring 33 is utilized to press wiper 21 against the windshield and that it is the locking force provided by locking arrangement 41–46 that prevents the wiper from being lifted off from the windshield by wind lift currents experienced at high vehicle speeds.

In more specific detail, the reason that spring retainer housing 24 cannot be rotated in a counterclockwise direction in FIG. 4 when lock arrangement 41–46 is in a locking condition is because ears 42 bear against lower walls 39 of slots 38 as a result of the biasing force produced by spring 51 bearing on planar portion 43. In this orientation, planar portion 43 extends at a slight angle from the normal with respect to the axis of rod 46. In other words, planar portion 43 is canted with respect to rod 46. This will cause the edges of aperture 45 in planar portion 43 to bite into rod 46 in the event there is an attempt to pivot spring retainer 24 in a counterclockwise direction.

However, in the event that it is desired to rotate spring retainer housing 24 in a counterclockwise direction in FIG. 4, as is required during the manual cleaning of a windshield, it is merely necessary to press tab 41 upwardly (FIG. 4). This will cause ears 42 of planar portion 43 to rotate in a counterclockwise direction (FIGS. 3 and 4) and come to rest against side wall 40 of trapezoidal slot 38. The foregoing rotation is effected against the bias of spring 51. When planar portion 43 has been moved to the foregoing position, the plane in which it lies extends perpendicularly to the longitudinal axis of rod 46. In this orientation, the edges of aperture 45 do not bite into rod 46 and, therefore, the lock 41–46 is rendered ineffective because rod 46 may slide with respect to aperture 45. Thus spring retainer housing 24 may be rotated in a counterclockwise direction about pivot pin 27 when tab 44 is actuated to cause lock 41–46 to assume the foregoing orientation.

After the wiper arm has been rotated away from the windshield in the above described manner, it is merely necessary to release the wiper arm to cause it to reset itself to provide the proper force for maintaining wiper 21 on the windshield. More specifically, when the wiper arm is released, the contraction of spring 33 will cause spring retainer 24 to pivot in a clockwise direction (FIG. 3) about pin 27. Such rotation is permitted by lock 41–46 because during such rotation ears 42 of lock member 41 are automatically pushed against upper trapezoidal wall 40 whereby said planar portion 43 extends perpendicularly to the longitudinal axis of rod 46 to thereby prevent the biting of the edges of aperture 45 into rod 46. Thus arm 20, because of the one way locking structure contained therein, permits spring 33 to bias a wiper carried by said arm into contact with the windshield under optimum pressure, while preventing the wiper arm from being lifted away from the windshield when it is subjected to wind lift forces.

Figure 2:
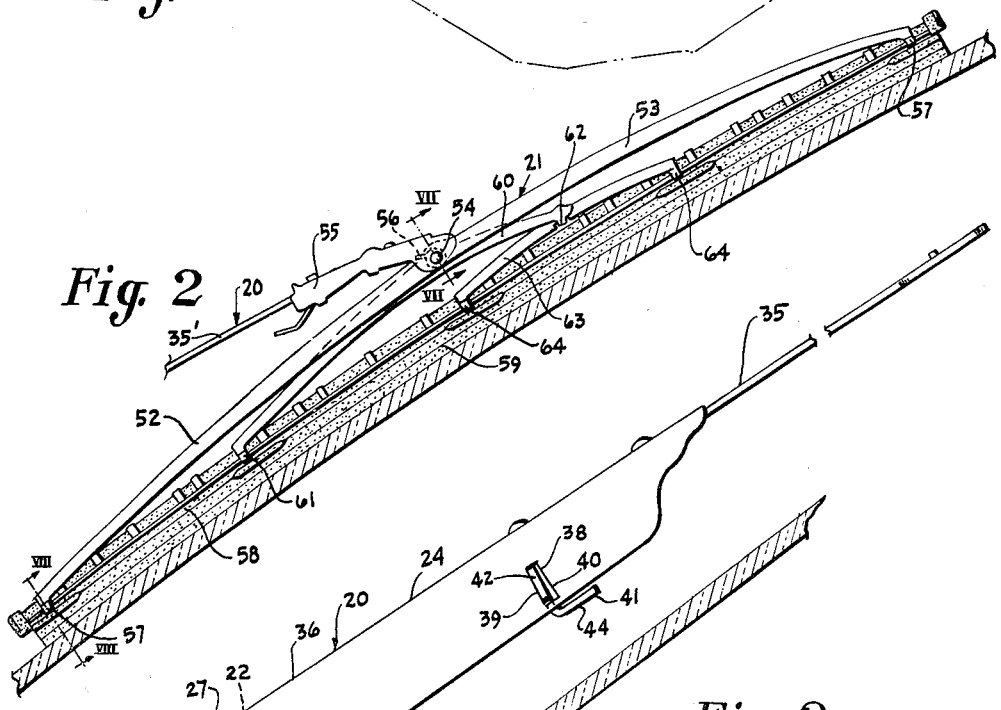
FIG. 2 is an elevational view of a windshield wiper of the type having portions of the superstructure which are spring biased.
Figure 7:
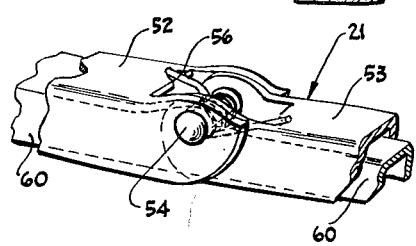
FIG. 7 is a fragmentary perspective view of a portion of the levers of the wiper of FIG. 2 showing in detail the relationship between the levers and the biasing spring.

In accordance with another aspect of the present invention, the above described improved anti-wind lift arm is used in combination with a windshield wiper incorporating spring biased levers to provide improved wiping action. More specifically, wiper 21 (FIG. 2) includes levers 52 and 53 which are pivotally mounted on pin or rivet 54 (FIG. 7) which also pivotally mounts clip 55 which, in turn, receives the end of bar stock portion 35 of wiper arm 20. The exact clip structure forms no part of the present invention, but may be made in any suitable manner, such as disclosed in U.S. Patent No. 2,807,822. A spring 56 (FIG. 7), which encircles rivet 54, has one end thereof pressing downwardly on lever 52 and the other end thereof pressing downwardly on lever 53. It can be seen from FIG. 7 that the ears (not numbered) at the inner ends of levers 52 and 53 have apertures therein which are in alignment when pin 54 is threaded through them and that one pair of ears of one of the levers fits within the other pair of ears of the other of the levers. The outer ends of levers 52 and 53 are formed into opposed U-shaped jaws 57 which loosely support the outer edges of flexible backing strip 58 therein. Flexible backing strip 58, in turn, supports rubber wiping element 59 in a manner disclosed in U.S. Patent No. 2,687,544. Since the specific relationship between the backing strip 58 and wiping element 59 form no part of the present invention, it is believed that a detailed discussion thereof is unnecessary especially since the structure thereof may be identical to that disclosed in the above noted patent. A lever member 60 is also pivotally mounted on pin 54. End 61 of lever 60 is formed into opposed U-shaped jaws 61, similar to jaws 57, which support the outer edges of the backing strip. The other end of lever 60 is formed into bent-over tabs 62 which rockably support the opposite sides of pressure equalizer 63, the latter having its opposite ends formed into opposed U-shaped jaws 64, similar to jaws 57, which slidably embrace the opposite marginal edges of the backing strip.

As the wiper traverses the curved portions of windshield 11, the outer ends of levers 52 and 53 will move toward the windshield as they pivot about pin 54 under the urging of spring 56. However, since the locking structure 41–46 prevents wiper arm spring housing section 24 from pivoting in a counterclockwise direction, the force produced by spring 56 will not subtract from the biasing force produced by spring 33. Thus the entire force of wiper spring 56 is utilized to force levers 52 and 53 in counterclockwise and clockwise directions, respectively, about pin 54 to thereby cause the wiping element 59 carried by the wiper to always be in good wiping contact with windshield 11 as the wiper oscillates back and forth across areas of varying curvature.

Figure 10:
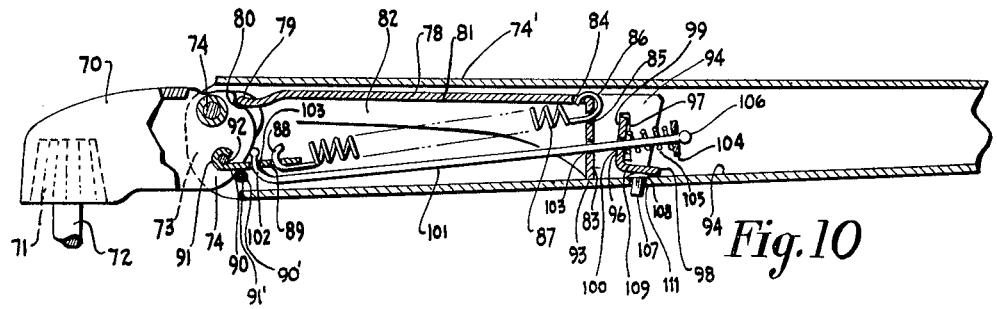
FIG. 10 is an elevational view of the arm of FIG. 9 with the side thereof removed to reveal the internal construction.
Figure 9:
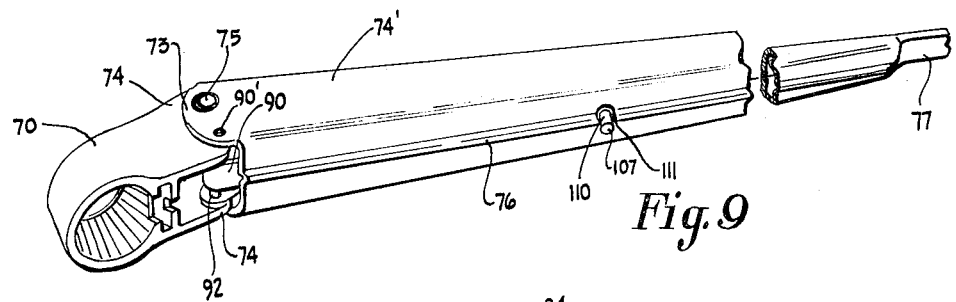
FIG. 9 is a fragmentary perspective view of a cartridge type of wiper arm having a modified embodiment of the present invention.
Figure 11:
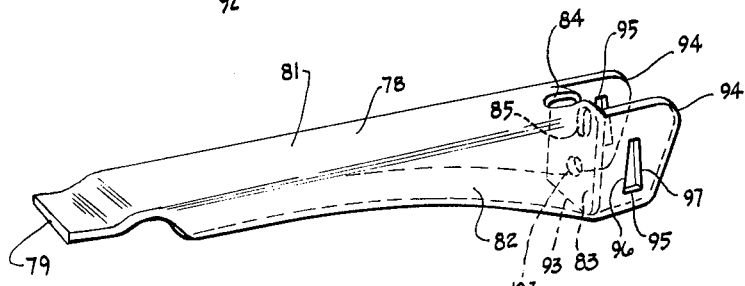
FIG. 11 is a perspective view of the cartridge of the arm of FIGS. 9 and 10.
Figure 12:
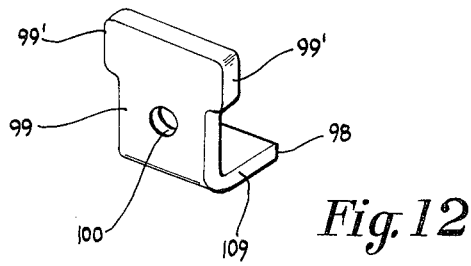
FIG. 12 is a perspective view of the locking member of FIG. 10.

In FIGS. 9, 10, and 11, a modified form of the present invention is disclosed for use with a wiper arm of the type using a spring cartridge. The exact construction of this type of cartridge arm is completely set forth in copending application Serial No. 48,974, filed August 11, 1960. The construction of the foregoing type of arm includes a mounting head portion 70 adapted to receive the knurled driver 71 on the outer end of drive shaft 72. Elongated tapered tubular spring retainer section 74' has ears 73 which are mounted on ears 74 of mounting head portion 70. A pin 75 is suitably secured in aligned apertures (not numbered) in the ears 73 and 74 to permit spring retainer section 74' to pivot toward and away from the windshield. Spring retainer section 74' has a seam weld 76 extending along the rear thereof. The outer end of spring retainer section 74' carries a bayonet 77 which is received in a clip such as as 55 mounted on a wiper.

A cartridge 78 is located within spring retainer section 74'. Cartridge 78 possesses a fulcrum 79 at one end thereof which is received in depression 80 on mounting head portion 70. Cartridge 78 also includes an upper wall 81 and side walls 82. An end wall 83 is also provided. Apertures 84 and 85 in upper wall 81 and end wall 83, respectively, receive the end 86 of spring 87. The other end 88 of spring 87 is received in aperture 89 of strap 90 having the end 91 thereof secured to pin 92 which is held in apertures (not numbered) in ears 74 of mounting head 70. It will be appreciated that spring 87 tends to rotate cartridge 78 in a clockwise direction in FIG. 10 about fulcrum 79 and that the end 93 of end portion 83 bears against the wall 94 of spring retainer 74' to cause the latter to also pivot in a clockwise direction.

In accordance with the present invention, a unidirectional locking construction is provided for permitting the spring retainer 74' to pivot in a clockwise direction under the urging of spring 87, but locks said section from pivoting in a counterclockwise direction. More specifically, the end of cartridge 78 is formed into ears 94 which are extensions of side walls 82. Each ear 94 possesses a trapezoidal slot 95 with walls 96 and 97. A locking member 98 is provided with substantially the same construction as locking member 41 of FIG. 6. Locking member 98 has ears 99' which are similar to ears 42 of locking member 41. These ears are extensions of plate member 99 having aperture 100 therein. Items 99 and 100 of FIG. 10 are analogous to items 43 and 45, respectively, of FIG. 6. An elongated cylindrical rod 101 is provided having the end 102 thereof held in aperture 103 of strap 90. Rod 101 also extends through aperture 103 in end plate 83 and aperture 100 of locking member 98. Aperture 103 is of a sufficiently large size so that it does not contact rod 101. However, aperture 100 in plate 99 of locking member 98 does grip rod 101 in a manner described above relative to FIG. 6. A washer 104 is located at the end of rod 101. A spring 105 is positioned between washer 104 and base member 99, the end 106 of rod 101 being peened to maintain the foregoing elements in assembly. It will readily be appreciated that because planar portion 99 of lock member 98 is normally biased by spring 105 to a position wherein the ears 99' lie against side wall 96 of trapezoidal slot 95, planar portion will lie at an angle to the longitudinal axis of rod 101 and the edges of aperture 100 in said plate member will tend to bite into rod 101 in the event an attempt is made to pivot spring retainer section 74' in a counterclockwise direction.

When the wiper arm is initially installed, spring retainer section 74' is held away from the windshield. When section 74' is released, the contraction of spring 87 will cause spring retainer portion 74' to move in a clockwise direction in FIG. 10 until such time as the wiper carried at the outer end thereof comes to rest against an associated windshield with the necessary wiping pressure, as determined by the strength of spring 87. It will be appreciated that such clockwise movement of spring housing 74' can take place because ears 99' extending from base plate 99 will be moved against walls 97 of trapezoidal slot 95, whereby the plane of planar member 99 of locking member 98 will lie substantially normal to the longitudinal axis of rod 101, this orientation being achieved against the bias of spring 105. In this orientation during movement of the arm toward the windshield, the edges of aperture 100 will not bite into rod 101.

A push button 107 has the end 108 thereof bearing against tab 109 of lock member 98 and also has a stem 110 extending through aperture 111 of spring retainer section 74'. Whenever it is desired to rotate spring retainer section 74' in a counterclockwise direction in FIG. 10, it is only necessary to press stem 111 of push button 107 inwardly toward the center of spring section 74'. This causes tab 109 to move upwardly in FIG. 10 and also causes planar portion 99 to move from a position wherein ears 99' thereof are resting against wall 96 of trapezoidal slot 95 to a position wherein said ears rest against side walls 97, the foregoing movement being effected against the bias of spring 105. When the foregoing orientation is obtained, planar portion 99 of locking member 98 will lie in a plane which is substantially normal to the longitudinal axis of rod 101 to thereby preclude the edges of aperture 100 from biting into rod 101 whereby said spring retainer housing 74' may be pivoted in a counterclockwise direction in FIG. 10. When spring retainer section 74' is released, the spring retainer section will pivot toward the windshield as described above.

The foregoing description has been essentially directed toward describing the manner in which the improved wiper arms of the present invention operate. However, before arms of the above types are shipped to a manufacturer for installation on vehicles, they are prepared in a certain manner to facilitate such installation. More specifically, the spring retainer sections 24 (FIG. 4) and 74' (FIG. 9) have apertures 30' and 90' therein, respectively. These apertures are located in the ears of the spring retainer sections. After the complete assembly of all of the components of the wiper arm of FIG. 4, spring retainer section 24 is pivoted in a counterclockwise direction to occupy the position shown in FIG. 4 and thereafter a pin 28' is inserted through aligned apertures 30' in ears 25. The pin which is thus supported by apertures 30' has the central portion thereof bearing against the edges of ears 22 to hold the wiper arm section 24 in the position shown in FIG. 4, spring 33 being stressed when the wiper arm is in this condition. After the manufacturer installs the wiper arm on the rockshaft 16 while the wiper arm is in the foregoing orientation, pin 28', which extends beyond the sides of the spring retainer section 24, is pulled out. Since spring 33 is under tension, it causes spring retainer section 24 to pivot in a clockwise direction (FIG. 4) until such time as the wiper carried by said wiper arm comes to rest against the windshield with the optimum pressure as determined by the stress of spring 33. It is to be noted that the wiper arms shown in FIGS. 3 and 4 occupy their pre-installation orientation. It will be understood, as noted above, that after the wiper arms have been installed, there will be relative clockwise rotation of spring retainer section 24 with respect to mounting head section 19 about pivot 27. An analogous arrangment is shown in FIG. 10 which relates to the modified embodiment of the present invention. In FIG. 10, which shows the wiper arm in the pre-installed condition, a pin 91' is located in apertures 90' in ears 73. Portions of this pin abut the edges of ears 74 to maintain the wiper in the orientation shown in FIG. 10 until after the wiper arm is installed on rockshaft 72. After this pin is removed, spring retainer section 74' pivots in a clockwise direction in FIG. 10 to occupy the position shown in FIG. 9 wherein apertures 90' lie over ears 74 of the mounting head section 70. As noted above relative to FIG. 4, after the pin 91' of FIG. 10 is removed, the wiper arm will pivot toward an associated windshield and the wiper carried thereby will come to rest with an optimum wiping pressure because of the predetermined strength of spring 87. Aside from the foregoing function, aligned apertures 30' of FIG. 4 and 90' of FIGS. 9 and 10 serve no other purpose.

Under certain circumstances, it may be desirable to limit the tilt of locking member 41 so as to vary the frictional force applied by the locking member to the rod 46 when the locking member 41 is in its locked position. It is further desirable that this limitation on the angular relationship between the plane of the locking member and the longitudinal axis of the rod 46 be adjustable or variable in order to obtain optimum antiwindlift forces, but yet prevent excessive force of the blade against the windshield and also to prevent damage to the arm due to accidental lifting of the arm without release of the locking member 41. To accomplish this, the modification shown in FIGS. 13 and 14 may be utilized. Although this modification is shown in FIGS. 13 and 14 as being utilized with the embodiment of FIGS. 1 through 8, it will of course be understood that it may also be utilized with the embodiment illustrated in FIGS. 9 through 12 or other embodiments falling within the scope of the invention in accordance with the broader aspects thereof.

Figure 5:
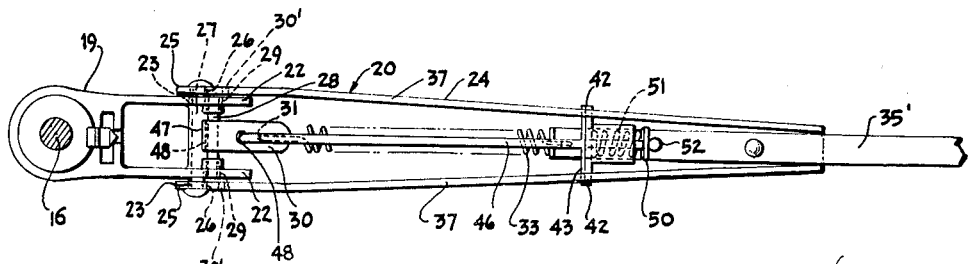
FIG. 5 is a bottom plan view of the improved wiper arm of FIG. 4.

Reference numerals identical to those utilized in FIGS. 4 and 5 will be employed to identify corresponding parts in FIGS. 13 and 14 and only the modified portion of the arm will be described in detail since, except for the modification, the arm shown in FIGS. 13 and 14 is identical to the arms shown in FIGS. 4 and 5.

To provide adjustment, a block 120 is secured within the tubular portion of arm 20 lying between the side walls 37 adjacent to and inwardly of the locking member 41. The block 120 may be secured to the wiper arm in any suitable manner as, for example, by a rivet 122, as shown. The block 120 includes a central opening 124 which receives rod 46 therethrough with sufficient clearance to permit free movement of the rod 46 in any position of the wiper arm. The block 120 includes laterally on each side of the opening 124 a threaded opening 126 for receiving threaded adjusting screws 128. The adjusting screws 128 are positioned threadably received within the openings 126 and extend therethrough into engagement with the inner surface of the locking member 41.

Thus it can be seen that by adjustment of the adjusting or stop screws 128, the angular relationship between the plane of the locking member 41 and the longitudinal axis of the rod 46 in the locked position may be varied and limited to a selected adjusted position. This provides a means for selectively varying the frictional force of the locking member 41 against the rod 46 when the locking member is in its locked position. It can be seen that by proper adjusting of the screws 128, the locking force may be set to any desired value. Thus, by proper setting of the adjusting screws, excessive force of the blade against the windshield will be prevented, should the wipers be displaced inwardly toward the windshield a greater amount than is desirable. This adjustment also provides means for preventing injury to the wiper arm should the blade be accidentally pivoted away from the windshield by excessive force without releasing the locking member 41.

It can thus be seen that the present invention discloses improved wiper arm constructions which apply optimum pressure to a wiper carried thereby during all conditions of vehicle operation and also positively prevent the wiper from being lifted from the windshield against the bias of the arm spring because of the lock mechanism which is utilized to prevent the wiper arm from moving in a direction away from the windshield. A benefit which is incidental to the maintaining of optimum wiping pressure on the wiping element of the wiper at all times resides in the fact that the wiping element is never subjected to excessive stresses which would contribute to its deterioration.

While preferred embodiments of the present invention have been disclosed, it will readily be understood that the present invention is not limited thereto, but that it may be otherwise embodied within the scope of the following claims.

What is claimed is:

1. A windshield wiper and wiper arm combination comprising a wiper arm including first spring means for biasing a portion of said arm toward an associated windshield, and lock means for preventing movement of said portion of said arm away from said associated windshield when said lock means are in a locked condition; and a windshield wiper including a wiping element, a superstructure for supporting said wiper element, and second spring means operatively associated with said superstructure for biasing portions of said superstructure toward said associated windshield to thereby cause said wiper element carried by said superstructure to conform to areas of varying curvature of said windshield; said first spring means in combination with said second spring means determining the wiping pressure with which said wiper element bears on said associated windshield, and said lock means associated with said wiper arm preventing the reactive force produced by the action of said second spring means on said levers from tending to subtract from the force produced by said first spring means biasing said wiper arm portion toward said windshield, whereby the entire force of said second spring means is directed to conforming said wiping element into engagement with said windshield.

2. A windshield wiper arm comprising a first section adapted to be mounted on a rockshaft, a second section, pivot means mounting said second section on said first section, spring means operatively connecting said second section to said first section to thereby bias said second section toward an associated windshield, means on said second section remote from said pivot for mounting a windshield wiper, and unidirectional lock means for preventing said second section from pivoting away from said windshield when said unidirectional lock means are in a locked condition but permitting said second section to pivot toward said windshield, said unidirectional lock means comprising an elongated rod fixedly mounted relative to said first arm section, a locking member movably mounted on said second arm section, said locking member engaging said elongated rod in clamping relationship to thereby lock said second section against movement away from said windshield, but permitting said second arm section to move toward said windshield, and means associated with said locking member for releasing the clamping relationship between said locking member and said elongated rod to permit said second arm section to be pivoted away from said windshield against the bias of said spring means.

3. A windshield wiper arm as set forth in claim 2 wherein said locking member includes a plate having an aperture therein for receiving said elongated rod, means on said second section for supporting said plate in a first position to produce said clamping relationship, said first position being with the plane of said plate lying at an angle to the longitudinal axis of said rod whereby the edges of said aperture in said plate provide said clamping relationship to prevent movement of said second arm section away from said windshield, said means associated with said locking member for releasing the clamping relationship comprising a member operatively attached to said locking member for moving said plate to a position wherein it lies substantially perpendicularly to the longitudinal axis of said rod to thereby permit said rod to move through said aperture without being subjected to the clamping engagement of the edges of said aperture.

4. A windshield wiper arm for biasing a wiper against a windshield with optimum wiping pressure but preventing said wiper arm from being moved away from said windshield by wind lift forces experienced when a vehicle is moving at high velocities, comprising a first arm section adapted to be mounted on a rockshaft located adjacent to said windshield, a second arm section pivotally mounted on said first arm section for movement toward and away from said windshield, spring means biasing said second arm section toward said windshield with an optimum wiping pressure whereby a wiping element carried by said wiper is not subjected to deteriorating stresses, unidirectional lock means operatively associated with said second section for permitting said spring means to bias said second section toward said windshield but preventing said second section from moving away from said windshield under the influence of wind lift forces when said unidirectional lock means is in a locked condition, manual means for deactuating said unidirectional lock means to permit said second arm section to be manually pivoted away from said windshield against the bias of said spring means, and means for causing said unidirectional lock means to return to a locking condition when said manual means are released whereby said spring means may cause said second section to move toward said windshield unimpeded by said unidirectional lock means to thereby cause a wiper carried by said second arm section to come to rest on said windshield with optimum wiping pressure, said unidirectional lock means automatically locking said second arm section against movement away from said windshield.

5. A windshield wiper arm assembly, means for mounting said arm assembly on a rotatable shaft for movement therewith, pivot means for permitting pivotal movement of said arm toward and away from the surface of a windshield, means for biasing said arm toward the surface of a windshield, unidirectional lock means for permitting movement of said arm toward said windshield in response to the application of a component of force to said arm having a direction toward said windshield while preventing movement of said arm in a direction away from said windshield regardless of the position of said arm.

6. A windshield wiper arm assembly according to claim 5 wherein said unidirectional locking means include means to release said locking means to permit said arm assembly to be pivoted away from said windshield against said biasing means.

7. A windshield wiper arm assembly, means for mounting said arm assembly on a rotatable shaft for movement therewith, pivot means for pivotal movement of at least a portion of said arm assembly toward and away from the surface of a windshield, means for biasing said arm toward ahe surface of a windshield, means for automatically locking said arm in any position assumed by said arm through application of a component of force toward said windshield and manually actuatable means for releasing said locking means.

8. A windshield wiper arm assembly, means for mounting said arm assembly on a rotatable shaft for movement therewith, pivot means for permitting pivotal movement of said arm toward and away from the surface of a windshield, means for biasing said arm toward the surface of a windshield, unidirectional frictional lock means for permitting movement of said arm toward said windshield in response to the application of a component of force to said arm having a direction toward said windshield while preventing movement of said arm in a direction away from said windshield regardless of the position of said arm and means for varying the frictional locking force.

9. A windshield wiper arm assembly, means for mounting said arm assembly on a rotatable shaft for movement therewith, pivot means for permitting pivotal movement of said arm toward and away from the surface of a windshield, means for biasing said arm toward the surface of a windshield, unidirectional frictional lock means for permitting movement of said arm toward said windshield in response to the application of a component of force to said arm having a direction toward said windshield while preventing movement of said arm in a direction away from said windshield regardless of the position of said arm and means for limiting the frictional force applied.

10. A windshield wiper arm assembly, means for mounting said arm assembly on a rotatable shaft for movement therewith, pivot means for pivotal movement of at least a portion of said arm assembly toward and away from the surface of a windshield, means for biasing said arm toward the surface of a windshield, means for automatically locking said arm in any position assumed by said arm through application of a component of force toward said windshield, manually actuatable means for releasing said locking means and means for varying the force required to overcome said means for automatically locking said arm.

11. A windshield wiper arm comprising a first section adapted to be mounted on a rockshaft, a second section, pivot means mounting said second section on said first section, spring means operatively connecting said second section to said first section to thereby bias said second section toward an associated windshield, means on said second section remote from said pivot for mounting a windshield wiper, and unidirectional lock means for preventing said second section from pivoting away from said windshield when said unidirectional lock means are in a locked condition but permitting said second section to pivot toward said windshield, said unidirectional lock means comprising an elongated rod fixedly mounted relative to said first arm section, a locking member movably mounted on said second arm section, said locking member engaging said elongated rod in clamping relationship to thereby lock said second section against movement away from said windshield, but permitting said second arm section to move toward said windshield, means for varying the force applied to said elongated rod by said locking member and means associated with said locking member for releasing the clamping relationship between said locking member and said elongated rod to permit said second arm section to be pivoted away from said windshield against the bias of said spring means.

References Cited by the Examiner

FOREIGN PATENTS 1,232,079   4/60   France.
1,091,888  10/60   Germany.

CHARLES A. WILLMUTH, *Primary Examiner.*